Patented May 20, 1941

2,242,315

UNITED STATES PATENT OFFICE 2,242,315

CLEANSING AND DISINFECTING PROCESS

James Douglas MacMahon, Niagara Falls, N. Y., assignor to The Mathieson Alkali Works, Inc., New York, N. Y., a corporation of Virginia No Drawing. Application May 12, 1938,
Serial No. 207,505

2 Claims. (Cl. 252—99)

This invention relates to improvements in the handling of calcium hypochlorite compositions, and more particularly to improvements promoting the use of calcium hypochlorite products in both hard and soft waters, and also in aqueous soap and alkaline detergent solutions, which eliminate the formation of difficultly soluble agglomerates.

The use of calcium hypochlorite products for cleansing and disinfecting purposes in solutions containing soaps or alkaline detergents, such as, for example, trisodium phosphate, has hitherto been limited due to the formation of insoluble calcium precipitates. It has recently been proposed to overcome this difficulty by incorporating in calcium hypochlorite compositions a solubilizing agent, such as an alkali metal metaphosphate, which prevents the precipitation of calcium soaps or other insoluble calcium compounds from the aqueous solutions in which the composition is dissolved. Such a mixture of calcium hypochlorite and alkali metal metaphosphate not only possesses the advantageous property of not precipitating calcium in the form of insoluble precipitates in aqueous solutions containing soaps or alkaline detergent salts, but also of not forming the usual precipitate of calcium carbonate when dissolved in hard waters. This proposed mixture may contain a calcium hypochlorite of high purity containing upwards of 50% available chlorine. The solubilizing agent, a metaphosphate, may be a sodium metaphosphate and should be present in an amount sufficient to introduce into the solution at least three phosphorous atoms for each calcium atom present in the calcium compounds of the dry mixture to be dissolved and in any calcium compounds already dissolved in the water.

A mixture of calcium hypochlorite and sodium metaphosphate of the type just described, although it possesses the referred to important advantages, nevertheless has the undesirable property of forming sticky, difficultly soluble lumps or agglomerates when added to water or aqueous solutions having a temperature approximating room temperature, or higher. In cold waters or solutions, this undesirable property is usually either absent or insufficient in effect to cause serious difficulties, but at a solution temperature of about 75° F., a temperature at which such mixtures are frequently used, the tendency to form lumps and agglomerates is marked, and as the temperature of the solution is raised above 75° F., this tendency increases.

The present invention comprehends the use in such circumstances of a calcium hypochlorite composition which contains a calcium hypochlorite and an alkali metal metaphosphate, but which does not possess this undesirable property of forming sticky, difficultly soluble lumps or agglomerates on solution suffered by the hitherto known mixtures of calcium hypochlorite and a metaphosphate.

I have discovered that a dry composition containing a calcium hypochlorite and an alkali metal metaphosphate together with sodium chloride in an amount approximating 15%–35% by weight of the mixture is free from any tendency to form sticky, difficultly soluble lumps on addition to aqueous solutions. Such a salt mixture can be dissolved in aqueous solutions including alkaline solutions of soaps, or of alkaline detergents, such as, for example, trisodium phosphate, and also in hard waters, to form a clear solution free of insoluble calcium precipitates without the formation of sticky agglomerates during the process of solution.

The calcium hypochlorite which I prefer to use in carrying out the present invention is one which is stable, contains upwards of 50%, or better upwards of 60%, available chlorine, and is low in calcium chloride and calcium hydroxide. This calcium hypochlorite constituent of the mixture may, with particular advantage, be in the form of a granular, substantially dustless product.

The solubilizing agent, an alkali metal metaphosphate such as sodium metaphosphate, and with particular advantage sodium hexametaphosphate, should be present in a proportion, chosen with respect to the amount of calcium ion to be supplied by the total calcium hypochlorite composition together with any calcium ions which may be present in the water or solution in which the product is to be dissolved, sufficient to render the mixture soluble in the aqueous medium used.

The proportion of sodium chloride present in the composition may vary with the amount of metaphosphate, but in general sodium chloride in an amount approximating 15%–35%, and in most cases between 15% and 20% by weight of the total mixture will be appropriate to cause such a mixture to dissolve without balling up or forming difficultly soluble masses. It is frequently desirable to use the lowest proportion of sodium chloride consistent with the attainment of easy solubility of the mixture without the formation of lumps in order to have the free metaphosphate concentration of the resulting solution as high as possible.

One illustrative example of a calcium hypochlorite composition which dissolves without the formation of lumps, in accordance with the present invention, contains approximately:

| | Parts by weight |
|---|---|
| Calcium hypochlorite of high purity and having an available chlorine content approximating 70%–74% | 14 |
| Sodium hexametaphosphate | 71 |
| Sodium chloride | 15 |

A mixture containing these relative proportions of calcium hypochlorite which has an available chlorine content of about 74%, sodium hexametaphosphate and sodium chloride will have an available chlorine content of about 9.7%. When a cleansing solution is prepared by dissolving one level measuring tablespoon of this mixture in three gallons of water the available chlorine content of the solution will amount to 152 parts per million, or if the same amount of the salt mixture is dissolved in four gallons of water the available chlorine content of the solution will amount to 113 p. p. m.

While the use of minor proportions of sodium chloride as an inert diluent in certain hypochlorite mixtures in order to bring the content of available chlorine in the mixture to certain desired values has been suggested, it has not so far as I am aware ever been suggested that the tendency of a mixture containing calcium hypochlorite and an alkali metal phosphate to form sticky difficultly soluble lumps on solution could be eliminated by incorporating in the mixture a proportion of sodium chloride approximating 15%–35% by weight.

I claim:

1. In a process involving the solution of a dry solid mixture of calcium hypochlorite and an alkali metal metaphosphate, present in an amount sufficient to render the mixture soluble in an aqueous solution of the class consisting of soap solutions, solutions of alkaline detergents and hard waters, in an aqueous medium, the improvement which comprises intimately admixing with the said solid mixture prior to its solution a proportion of sodium chloride ranging from about 15% to 35% by weight of the mixture, and adding the resulting mixture to the aqueous medium, whereby the tendency to form sticky difficultly soluble agglomerates is minimized.

2. In a process involving the solution of a dry solid mixture of calcium hypochlorite and an alkali metal metaphosphate, present in an amount sufficient to render the mixture soluble in an aqueous solution of the class consisting of soap solutions, solutions of alkaline detergents and hard waters, in an aqueous medium, the improvement which comprises intimately admixing with the said solid mixture prior to its solution a proportion of sodium chloride equal to about 20% by weight of the mixture, and adding the resulting mixture to the aqueous medium, whereby the tendency to form sticky difficultly soluble agglomerates is minimized.

JAMES DOUGLAS MacMAHON.